Sept. 15, 1959  LA MOINE E. JOHNS  2,903,775
SLIDE FASTENERS
Filed March 26, 1956
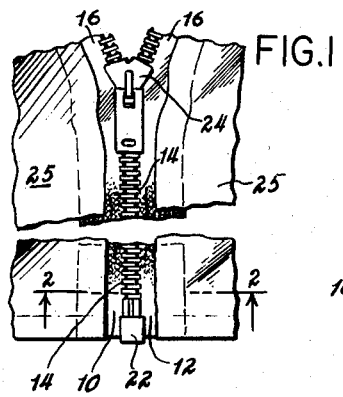
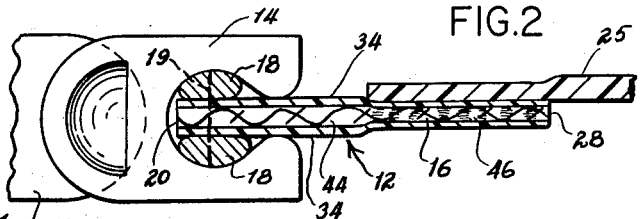
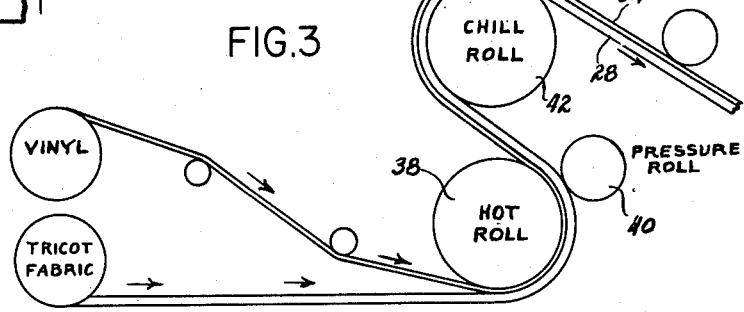
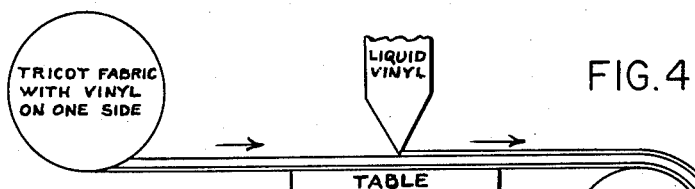
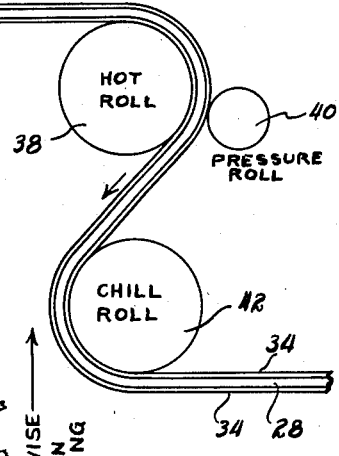
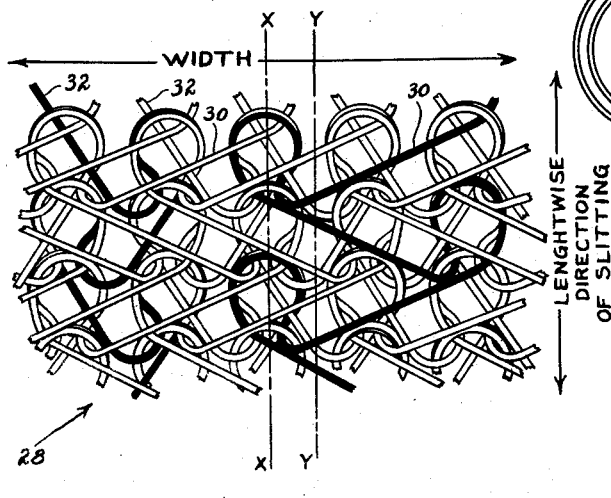
INVENTOR.
LAMOINE E. JOHNS
BY
ATTORNEYS United States Patent Office 2,903,775
Patented Sept. 15, 1959

2,903,775

SLIDE FASTENERS

La Moine E. Johns, Westfield, N.J., assignor to Conmar Products Corporation, Newark, N.J., a corporation of New Jersey Application March 26, 1956, Serial No. 573,912

16 Claims. (Cl. 24—205.16)

The invention relates to slide fasteners, and is more particularly directed to slide fasteners of the heat-sealable type.

Heat-sealable slide fasteners are made for use with products fabricated of thermoplastic sheeting, generally of a vinyl composition, as for example, raincoats, pillow covers, clothing bags, and various other products. It has been found that stitching an ordinary woven tape fastener to the plastic product is unsatisfactory, because the line of perforations formed by the needle weakens the plastic material causing it to tear readily at the perforations. A stronger assembly or connection may be obtained if the tapes of the slide fastener are made to permit heat-sealing to the plastic product.

A heat-sealable slide fastener in general commercial use is made with tapes formed of strips of vinyl plastic. Wide, continuous sheeting of the plastic material, which may vary in thickness from approximately 0.008 to 0.020 inch, is unrolled and passed through a slitting machine which cuts the material longitudinally into a plurality of continuous narrow strips of desired tape width, for example, ¾", ⅞", 1", etc. These strips are processed by the slide fastener manufacturer in much the same way as fasteners made with ordinary woven tape; that is, cords are sewn onto opposite sides of the vinyl strip along an edge thereof, and then the interlockable fastener elements are secured or clamped in spaced relationship onto the cord-sewn edge of the strip.

The resulting product is not nearly as strong as when the fastener elements are attached to the usual fabric tape. Sewing the cords to the edge of the vinyl strip perforates the material, and provides a zone of weakness, and as a result, the fastener elements which are clamped to this area of the tape have little resistance to the usual forces encountered in use which tend to displace them. The fastener is weak in cross-pull strength. Also, the resistance of the fastener elements to displacement along the tape is low, which is most undesirable at the bottom assembly components of a fully separable fastener. Moreover, while the vinyl plastic tape will bend adequately in a transverse direction, it does not flex adequately in its own plane, and as a result, the slider cannot be moved easily and smoothly to close and open the fastener. The fastener is considered "hard running." Easy smooth operation of a slide fastener requires that the tapes be very flexible in their own planes. Fabric tape possesses this property, because of the woven or discontinuous structure, which allows relative movement between adjacent threads or yarns. Tape of vinyl plastic, on the other hand, is continuous and comparatively stiff in its own plane. Also, when the thickness of the vinyl strip tape is increased to furnish increased strength, the result is even less flexibility, and an even harder running fastener. Thus, in satisfying the demand for a heat-sealable slide fastener, a substantial sacrifice has been made in fastener strength and fastener running qualities.

To obtain the desired strength, it has been proposed to impregnate a woven fastener tape with thermoplastic material, specifically a vinyl plastic. However, a tape having a weave pattern and yarn density suitable for strength, after impregnation with a sufficient amount of the thermoplastic material, is unduly stiff. Moreover, such tapes are expensive because they are individually woven to the desired narrow widths, and the added cost of impregnation results in a very expensive product.

The main objects of the invention are to provide a slide fastener having tapes constructed to furnish satisfactory heat-sealing properties, a large measure of strength, and a high degree of flexibility in the plane of the tapes for easy and smooth-running qualities of the fastener, coupled with low cost of manufacture.

These, and other objects, advantages and results, will be apparent from the following detailed description taken in conjunction with the drawings, in which:

Fig. 1 is a partial top plan view of a slide fastener made in accordance with my invention, heat-sealed to edges of a plastic article to provide a closure therefor;

Fig. 2 is a cross section, greatly enlarged, taken approximately in the plane of line 2—2 of Fig. 1;

Fig. 3 is a schematic view showing a procedure for laminating a layer of thermoplastic material to a wide web of knitted fabric, preliminary to slitting continuous narrow width tapes therefrom for use in making the slide fastener of my invention;

Fig. 4 is a view similar to Fig. 3 showing an alternative method for applying the thermoplastic coating to the knitted fabric; and Fig. 5 is a plan view, greatly enlarged, of a portion of a tricot knit fabric structure, which type of fabric is preferred in making the tapes for the slide fastener of the invention.

Generally, the invention resides in forming the tapes of a slide fastener of thin, strong, closely textured, highly flexible knitted fabric, which is dimensionally stable in a lengthwise direction, the fabric being provided with a thin thermoplastic coating localized largely at the surface thereof so that the flexibility of the resultant coated fabric in its own plane is not appreciably reduced. The fabric is preferably warp-knitted for longitudinal dimensional stability. Strong threads of yarn or monofilament of fine or low denier are used, and the fabric is knitted on a fine gauge machine to provide the thin, strong, closely textured fabric structure. The character of the knitted structure, coupled with the low denier of the yarns furnishes the flexibility needed, including the flexibility in the plane of the fabric. The fine gauge knit provides the close texture which permits localizing of the coating mainly upon the surface, with little penetration or impregnation of the fabric, and by keeping the coating thin, but in an amount sufficient for heat-sealing, the degree of flexibility needed for an easy running fastener is maintained. The tapes are comparatively inexpensive to manufacture because the described fabric may be knitted to widths of 40 inches or more, coated, and slit into a plurality of continuous length tapes of desired narrow widths. The looped structure of the knitted fabric, unlike a woven fabric, has no tendency to ravel, nor is it unduly weakened at a cut edge, thereby providing an area of substance for cord sewing and fastener element attachment.

Specifically describing the preferred embodiment of the invention, and referring to Figs. 1 and 2, the slide fastener comprises a pair of stringers 10 and 12 each provided with spaced interlockable elements 14. The stringers each comprise a tape 16 of predetermined width provided with a longitudinal beaded edge about which the fastener elements are clamped. As shown, the beaded edges are formed by sewing cords 18 and 18' by a line of stitching 19 onto opposite sides of each tape along an edge thereof, designated 20. The stringers are provided with a top stop (not shown) and a bottom stop of any suitable or known variety. The illustrated form of the invention shows a fully separable fastener having a separable bottom stop assembly 22. A slider 24 engages and disengages the fastener elements to close and open the fastener. The tapes 16 are heat-sealed to plastic material, designated 25, such as the vinyl sheeting of a raincoat, garment bag or the like.

The textile portion, generally designated 28, of the tapes 16 is a warp knitted fabric which may be made on any suitable warp knitter, such as a tricot, raschel or simplex machine. A tricot fabric is preferred because of the high speed operation of the machine and the fine gauge fabric it is capable of producing at comparatively low cost. A closely textured fabric is provided, and for this purpose the fabric is preferably knitted on a 28 gauge machine. Fabrics having 26 to 32 loops per inch are suitable. The fabric shown in Fig. 5 is a double-warp, two-bar tricot fabric, and is preferable to a single-warp, one-bar fabric. The double warp loop structure provides excellent resistance to raveling when slit. The application of tensile forces to the front bar and back bar loop threads, 30 and 32, respectively, even after cutting, does not unduly harm or weaken the essential knitted structure; in any given loop, one thread is in effect pitted against the other to tighten the loop when tension is applied. This is true if the fabric is cut or slit longitudinally or warp-wise through the loops, as along the line x—x, or through the linkage portions of the threads, as along the line y—y, or any point between the lines (i.e. any point at all).

The threads are made of yarn or monofilament having from 0 to 10 turns, and may range in denier from 15 to approximately 70, 40 denier being preferred. The yarn is preferably formed of a polyamide, or nylon, because this fiber not only possesses high strength for low weight or denier, but it additionally possesses the characteristic which permits "setting." "Setting" is accomplished by applying heat in the form of saturated steam to the nylon knitted fabric while it is stretched warpwise. This imparts a high degree of additional dimensional stability to the fabric in the direction of stretching, which is done warp-wise or in the direction of the wales. This is particularly desirable for processing the tapes in the "scoop machine" where tension is applied lengthwise of the tape. Stretching and "setting" of the fabric also results in a measure of elasticity width-wise, or in the direction of the courses, which is desirable in the tapes of the finished slide fastener.

The described warp-knitted nylon fabric is coated with a suitable thermoplastic composition, preferably a vinyl compound, such as a polyvinyl chloride, or a copolymer of polyvinyl chloride and polyvinyl acetate, for these are the compositions generally used in the sheeting from which the plastic products are made, and to which the fasteners will be heat-sealed. The coating, generally designated 34, may be applied by laminating a preformed thin film to a surface of the fabric, as shown in Fig. 3, or by applying the coating from a viscous solution, as shown in Fig. 4. One, and preferably both sides of the fabric may be coated with the vinyl composition. A preformed film may be applied to both sides, or the coating may be applied from solution to both sides, or a preformed film to one side and the liquid coating to the other, as shown. The coating is applied so that it is confined mainly to the surface of the fabric, with penetration or impregnation kept to a minimum. As shown, the fabric and coating are passed between a heated roll 38 and a pressure roll 40 to achieve a bond between the coating and the textile fabric, and before the coating may penetrate too deeply in the fabric, the coated fabric is led over a cooling or chill roll 42. In this manner the coating is firmly adhered to the knitted fabric, though it is kept quite thin. A double-warp, two-bar tricot nylon fabric, 40 denier, may be coated with a thermoplastic material in the manner described to a thinness of approximately 0.005 inch, plus or minus 0.002 inch, on each side to provide a total thickness of coated fabric of approximately 0.016 inch. Such coated fabric is well-suited for number 3 fasteners. The resulting coated fabric is highly flexible not only in a transverse direction but in its own plane.

After coating, the continuous wide web is passed through a slitting machine and cut lengthwise, in the direction indicated in Fig. 5, into a plurality of strips to the widths desired for the slide fastener tapes. The strips are then ready for sewing of the cords along an edge thereof, clamping of the fastener elements thereon, and the application of top and bottom stops.

The knitted structure of the textile fabric provides closely spaced hinge points along any line of cutting, x—x, or y—y, or lines cutting intermediate these lines, so that areas of crossed yarns or threads, which have no tendency to ravel, are at all times located between the jaws of each of the spaced fastener elements when they are attached to the cut edge. Moreover, when the cords are sewn along the cut edges of the tapes, unlike the comparatively loose structure of a cut edge of woven fabric, there are always threads of the fabric where the needle passes through the cord and the fabric. In fact, applying tension at any point along the cut edge serves to tighten the loops because each loop is a double loop of opposing threads. A "number 3" size slide fastener made in accordance with the present invention, as compared to the same size fastener made with tapes of solid vinyl strip, the thicknesses of both tapes being the same (approximately 0.016 inch), is about 250% stronger in cross-pull strength. The resistance to fastener element displacement lengthwise of the tape is increased in about the same magnitude.

As shown in Fig. 2, when the margin of the coated tape 16 is heat-sealed to the marginal zone of the plastic article 25, the surface coatings 34 at the overlapped areas, under the influence of the pressure exerted by the heated bar-sealer, or the "electronic stitcher" (high frequency heat and pressure), migrate through or impregnate the knitted fabric to furnish a strong bond between the tape and the plastic product. The zone of the tape, designated 44, which is not heat-sealed, and which is located between the fastener elements and the heat-sealed portion of the tape, still retains its flexibility in its own plane for smooth and easy running quality of the fastener.

It is important to recognize the contrast between the zone 44 of the tape which is not heat-sealed, and the zone 46 of the tape which is heat-sealed. The coating 34 is essentially a surface coating, and its adherence to the fabric would not be strong enough to be relied upon to hold the fastener to the product 25. In the zone 46, however, there is an impregnation of the plastics material through the fabric, thereby locking the fastener strongly to the product 25. It will not do to impregnate the plastics material 34 over the entire width of the stringer tape (which might be done during the coating steps illustrated in Figs. 3 and 4 of the drawing), for in such case the tape will become much like a strip of solid plastics sheeting, that is, it will become inflexible in its own plane and "hard running." When the coatings 34 remain essentially surface coatings, as shown in zone 44, the tapes remain flexible and the fastener remains easy-running, even though the more remote zone 46 may lose its flexibility during the heat-sealing operation. One advantage of the close knit of the fabric is to help keep the coating on or near the surface. At zone 46 the tape need be no more flexible than the product 25, which is solid plastics sheeting. In the present invention strength is provided in zone 46 where strength is needed and where flexibility may be sacrificed, while flexibility is retained in zone 44, and also between the successive fastener elements, where flexibility is needed.

While the warp knitted fabric is preferably made with nylon yarn because this material furnishes unusually high strength with low denier in combination with the characteristic of "setting" for additional dimensional stability, it is within the scope of the invention to use acrylic or polyester fibres, such as "Orlon" or "Dacron," or combinations of nylon and viscose, or nylon and cotton, or cotton, or viscose fibres.

It will be understood that the coatings applied to the tape in Figs. 3 and 4, and shown at 34 in Fig. 2, are a plastics material which is compatible with and sealable to the particular plastics material of the product on which the fastener is to be used. In the specific case here shown the coatings are vinyl, because the most common plastics sheeting in use for garments, clothing bags, pillow cases, and other such products, is vinyl.

It is believed that the advantages and improved results of my novel slide fastener will be apparent from the foregoing detailed description. It will also be apparent that while a preferred form of the invention has been shown and described, changes may be made in the structure disclosed, without departing from the spirit of the invention, as sought to be defined in the following claims.

I claim:

1. A heat-sealable slide fastener comprising a pair of stringers each having spaced interlockable metal fastener elements having jaws which are clamped on the beaded longitudinal edge of a tape, said tape comprising a single layer of fine gauged knitted fabric having dimensional stability in a lengthwise direction, said fabric being provided on both outside surfaces with a thin coating of thermoplastic vinyl material confined mainly to the surface of the fabric, whereby the tape has substantial flexibility in its own plane.

2. A heat-sealable slide fastener comprising a pair of stringers each having spaced interlockable fastener elements attached to the longitudinal edge of a tape of predetermined width having cords sewn to each side thereof, said tape comprising a single layer of fine gauge warp-knitted fabric cut lengthwise in the direction of the warps to the predetermined width, said fabric being provided on both outside surfaces with a thin coating of thermoplastic material confined mainly to the surface of the fabric, whereby the tape has substantial flexibility in its own plane.

3. A heat-sealable slide fastener as set forth in claim 2, wherein the warp-knitted fabric has a gauge of approximately 26 to 32 loops per inch, and the threads thereof have a denier range of 15 to 70.

4. A heat-sealable slide fastener as set forth in claim 2, wherein the warp knitted fabric comprises a double-warp, two-bar tricot fabric.

5. A heat-sealable slide fastener as set forth in claim 2, wherein the warp-knitted fabric comprises a double-warp, two-bar tricot fabric having a gauge of approximately 26 to 32 loops per inch, and the threads thereof have a denier range of 15 to 70.

6. A heat-sealable slide fastener as set forth in claim 2, wherein the warp-knitted fabric comprises a double-warp, two-bar tricot fabric having a gauge of 28 loops per inch, and the threads thereof have a denier of 40.

7. A heat-sealable slide fastener as set forth in claim 2, wherein the warp-knitted fabric comprises a nylon tricot fabric.

8. A heat-sealable slide fastener as set forth in claim 2, wherein the warp-knitted fabric comprises a nylon tricot fabric which has been additionally dimensionally stabilized in a length-wise direction by stretching and setting the fabric in the direction of the warps.

9. A heat-sealable slide fastener as set forth in claim 2, wherein the warp-knitted fabric comprises a nylon double-warp two-bar tricot fabric having a gauge of approximately 26 to 32 loops per inch and the threads thereof have a denier range of 15 to 70.

10. A heat-sealable slide fastener as set forth in claim 2, wherein the warp-knitted fabric comprises a nylon, double-warp, two-bar tricot fabric having a gauge of 28 needles or loops per inch, and the threads thereof have a denier of 40, said fabric being additionally dimensionally stabilized in a lengthwise direction by stretching and setting the fabric in a direction of the warps.

11. A heat-sealable slide fastener as set forth in claim 2, wherein the coating has a thickness of approximately 0.005 inch, plus or minus 0.002 inch.

12. A heat-sealable slide fastener as set forth in claim 2, wherein the warp-knitted fabric is a nylon, double-warp, two-bar tricot fabric having a gauge of approximately 26 to 32 loops per inch, the threads thereof have a denier of 15 to 70, said fabric being additionally dimensionally stabilized in a length-wise direction by stretching and setting the fabric in the direction of the warps, and wherein the coating has a thickness of approximately 0.005 inch, plus or minus 0.002 inch, on each side of the fabric.

13. A heat-sealable slide fastener as defined in claim 2, in which the coating is a vinyl plastics material.

14. In a product made of a vinyl plastics material in sheet form and having a slide fastener acting as a closure for siad product, said slide fastener comprising a pair of stringers each having spaced interlockable fastener elements attached to the beaded longitudinal edge of a single layer fabric tape with the outer marginal portions of said tape being heat sealed to adjacent overlapping edges of said sheet vinyl plastics material, the combination with the fabric tape of said fastener, of a coating of vinyl thermoplastics material, the said coating being one which is compatible with and sealable to the plastics material of the product, said coating in the area outside the overlapped heat sealed marginal portions being confined mainly to the surface of the fabric, whereby the tape has substantial flexibility in its own plane, and said coating where heat sealed at the marginal overlapped area being impregnated through and thereby strongly locked to the fabric tape in said overlapped area.

15. In a product made of a sheet plastics material and having a slide fastener acting as a closure for said product, said fastener having the usual spaced interlockable metal fastener elements having jaws which are clamped on the beaded longitudinal edge of a tape, the outer marginal portions of said fastener tape being heat sealed to adjacent overlapping edges of said sheet plastics material of said product, said tape comprising a single layer of fine gauge knitted fabric cut lengthwise in the direction of the warps to the desired width, and a coating of a thermoplastics material on said tape, the thin coating being one which is compatible with and heat sealable to the plastics material of the product, said coating in the area outside the overlapped heat sealed marginal portions being confined mainly to the surface of the fabric, whereby the tape has substantial flexibility in its own plane, and the coating where heat sealed at the aforesaid marginal overlapped area being impregnated through and thereby strongly locked to the fabric tape.

16. In a product made of a sheet plastics material and having a slide fastener acting as a closure for said product, said fastener having the usual spaced interlockable fastener elements and stitched cords for a tape edge, the outer marginal portions of said fastener being heat sealed to adjacent overlapping edges of said sheet plastics material of said product, the combination with the fastener elements and cords, of a tape comprising a single layer of fine gauge warp knitted fabric cut lengthwise in the direction of the warps to the desired width, and a thin coating of a thermoplastics material on said tape, the coating being one which is compatible with and heat sealable to the sheet plastics material of the product, said coating in the area outside the overlapped heat sealed marginal portions being confined mainly to the surface of the fabric, whereby the tape has substantial flexibility in its own plane, and the said coating where heat sealed at the aforesaid marginal overlapped area being impregnated through and thereby strongly locked to the fabric tape.

References Cited in the file of this patent

UNITED STATES PATENTS

| | | |
|---|---|---|
| 1,632,064 | Gammeter | June 14, 1927 |
| 1,799,210 | Blaskopf | Apr. 7, 1931 |
| 2,269,419 | Adler et al. | Jan. 13, 1942 |
| 2,287,324 | Poux | June 23, 1942 |
| 2,368,911 | Andler | Feb. 6, 1945 |
| 2,402,631 | Hull | June 25, 1946 |
| 2,470,251 | Kolbert et al. | May 17, 1949 |
| 2,533,976 | Teague | Dec. 12, 1950 |
| 2,768,922 | Klein | Oct. 30, 1956 |

FOREIGN PATENTS

| | | |
|---|---|---|
| 592,759 | Great Britain | Sept. 29, 1947 |
| 727,479 | Great Britain | Apr. 6, 1955 |